United States Patent
Naganuma et al.

(10) Patent No.: US 12,054,243 B2
(45) Date of Patent: Aug. 6, 2024

(54) ROTARY-WING AIRCRAFT

(71) Applicant: SUBARU CORPORATION, Tokyo (JP)

(72) Inventors: Katsunori Naganuma, Tokyo (JP); Hiroshi Nagai, Tokyo (JP); Taku Sagara, Tokyo (JP); Hiroshi Fujisawa, Tokyo (JP); Toshiyuki Ichiki, Tokyo (JP); Ryosuke Sato, Tokyo (JP); Hokuto Yamane, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 589 days.

(21) Appl. No.: 17/222,603

(22) Filed: Apr. 5, 2021

(65) Prior Publication Data

US 2021/0347470 A1    Nov. 11, 2021

(30) Foreign Application Priority Data

May 11, 2020 (JP) .................................. 2020-083506
Sep. 7, 2020 (JP) .................................. 2020-149648

(51) Int. Cl.
*B64C 27/00* (2006.01)
*B64D 37/32* (2006.01)
(Continued)

(52) U.S. Cl.
CPC ............ *B64C 27/001* (2013.01); *B64D 37/32* (2013.01); *F16F 15/002* (2013.01); *F16F 9/5123* (2013.01);
(Continued)

(58) Field of Classification Search
CPC .......... F41F 3/06; B64C 27/001; B64D 37/32; B64D 1/02; B64D 7/08; B64D 1/04; B64D 1/00; B64D 1/12; F16F 2228/04
See application file for complete search history.

(56) References Cited

U.S. PATENT DOCUMENTS 3,766,828 A * 10/1973 Cords ...................... B64D 7/00
                                                                89/1.816
4,343,447 A    8/1982 Reed, III
(Continued)

FOREIGN PATENT DOCUMENTS

DE    3538274 A1    4/1987
GB    2177668 A    1/1987
(Continued)

OTHER PUBLICATIONS

Extended European Search Report issued in corresponding European Patent Application No. 21172074.3-1010, dated Oct. 7, 2021.
(Continued)

*Primary Examiner* — Joshua J Michener
*Assistant Examiner* — Cindi M Curry
(74) *Attorney, Agent, or Firm* — Rimon P.C.

(57) ABSTRACT

A rotary-wing aircraft includes a fuselage, and an external device. The fuselage is provided with a rotary wing. The external device is mounted on the outside of the fuselage. The external device includes a mounting device, a mass variation device, and a damper. The mounting device is fixed to the fuselage and disposed so as to project in a lateral direction of the fuselage. The mass variation device is mounted on the mounting device and has mass that varies as the mass variation device is used. The damper couples the fuselage to the mounting device and supports the mounting device. The damper includes a stiffness variable mechanism configured to change stiffness of the damper in response to variation in the mass of the mass variation device.

19 Claims, 11 Drawing Sheets

(51) Int. Cl.
*F16F 9/512* (2006.01)
*F16F 9/53* (2006.01)
*F16F 15/00* (2006.01)

(52) U.S. Cl.
CPC ........... *F16F 9/535* (2013.01); *F16F 2228/04* (2013.01); *F16F 2228/066* (2013.01); *F16F 2230/18* (2013.01)

(56) References Cited

U.S. PATENT DOCUMENTS

| | | | | |
|---|---|---|---|---|
| 4,502,652 | A * | 3/1985 | Breitbach | B64D 1/02 188/380 |
| 5,148,734 | A * | 9/1992 | Lilly | F41F 3/06 89/1.819 |
| 6,164,915 | A * | 12/2000 | Certain | B64C 27/001 416/134 A |
| 8,353,237 | B2 * | 1/2013 | Middleton | B64D 1/04 89/1.57 |
| 2008/0142633 | A1 * | 6/2008 | McGuire | B64C 27/001 244/129.1 |
| 2009/0321556 | A1 * | 12/2009 | Pancotti | B64C 27/001 244/17.27 |
| 2019/0360505 | A1 * | 11/2019 | Belter | B60G 21/067 |
| 2020/0164982 | A1 * | 5/2020 | Keller | B64D 1/02 |
| 2020/0164984 | A1 * | 5/2020 | Keller | B64D 1/04 |

FOREIGN PATENT DOCUMENTS

| | | |
|---|---|---|
| JP | H02-231214 A | 9/1990 |
| JP | H04-176796 A | 6/1992 |
| JP | H09-99722 A | 4/1997 |
| JP | 2002-029499 A | 1/2002 |

OTHER PUBLICATIONS

Notice of Reasons for Refusal received in Japanese Patent Application No. 2020-149648, mailed Apr. 2, 2024.

* cited by examiner

ROTARY-WING AIRCRAFT

CROSS-REFERENCE TO RELATED APPLICATIONS

The present application claims priority from Japanese Patent Applications No. 2020-083506 filed on May 11, 2020 and No. 2020-149648 filed on Sep. 7, 2020, the entire contents of which are hereby incorporated by reference.

BACKGROUND

The disclosure relates to a rotary-wing aircraft.

In order to add additional functions to a rotary-wing aircraft such as a helicopter, various external devices (for instance, a fuel tank, a storage pod) may be mounted on the outside of the fuselage (body).

For instance, Japanese Unexamined Patent Application Publication (JP-A) No. 2002-029499 describes a helicopter in which storage pods are mounted via an adapter on the right and left sides of the fuselage, and a storage pod for relay is mounted via another adapter on the lower side of the fuselage. In the helicopter described in JP-A No. 2002-029499, the storage pods are suspended and supported by a damper tube from an upper side of the fuselage to stably maintain the state of the storage pods mounted on the fuselage.

SUMMARY

An aspect of the disclosure provides a rotary-wing aircraft. This includes a fuselage, and an external device. The fuselage is provided with a rotary wing. The external device mounted on an outside of the fuselage. The external device includes a mounting device, a mass variation device, and a damper. The mounting device is fixed to the fuselage and disposed so as to project in a lateral direction of the fuselage. The mass variation device is mounted on the mounting device and has mass that varies as the mass variation device is used. The damper couples the fuselage to the mounting device and supports the mounting device. The damper includes a stiffness variable mechanism configured to change stiffness of the damper in response to variation in the mass of the mass variation device.

BRIEF DESCRIPTION OF THE DRAWINGS

The accompanying drawings are included to provide a further understanding of the disclosure and are incorporated in and constitute a part of this specification. The drawings illustrate an embodiment and, together with the specification, serve to explain the principles of the disclosure.

DETAILED DESCRIPTION

When a helicopter is in normal operation, the blades of a rotor rotate at a substantially constant number of revolutions, and vibration occurs mainly in the rotor hub, the vibration having a frequency equal to the number of revolutions multiplied by the number of the blades. As a consequence, the rotor in rotation becomes a source of vibration, and the whole fuselage vibrates at a predetermined frequency.

When an external device mounted on the outside of the fuselage includes a sub-device having a mass which varies with usage, the natural frequency of the external device changes in response to variation of the mass of the external device. For example, when the external device includes a fuel tank, use of the fuel in the fuel tank during the operation of the helicopter reduces the mass of the fuel tank, and the natural frequency of the fuel tank is thus increased. When the natural frequency of the external device is changed in this manner, the natural frequency of the external device may fall, during the operation of the helicopter, within a range of frequency which causes resonance with the fuselage vibration accompanied by the rotation of the rotor. As a result, a problem arises in that the external device significantly resonates, and the amplitude is increased.

It is desirable to provide a rotary-wing aircraft that reduces the resonance of the external device with fuselage vibration even when the mass of the external device mounted on the outside of the fuselage of the rotary-wing aircraft varies.

In the following, an embodiment of the disclosure is described in detail with reference to the accompanying drawings. Note that the following description is directed to an illustrative example of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following embodiment which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description.

1. Entire Configuration of Helicopter

Figure 1:
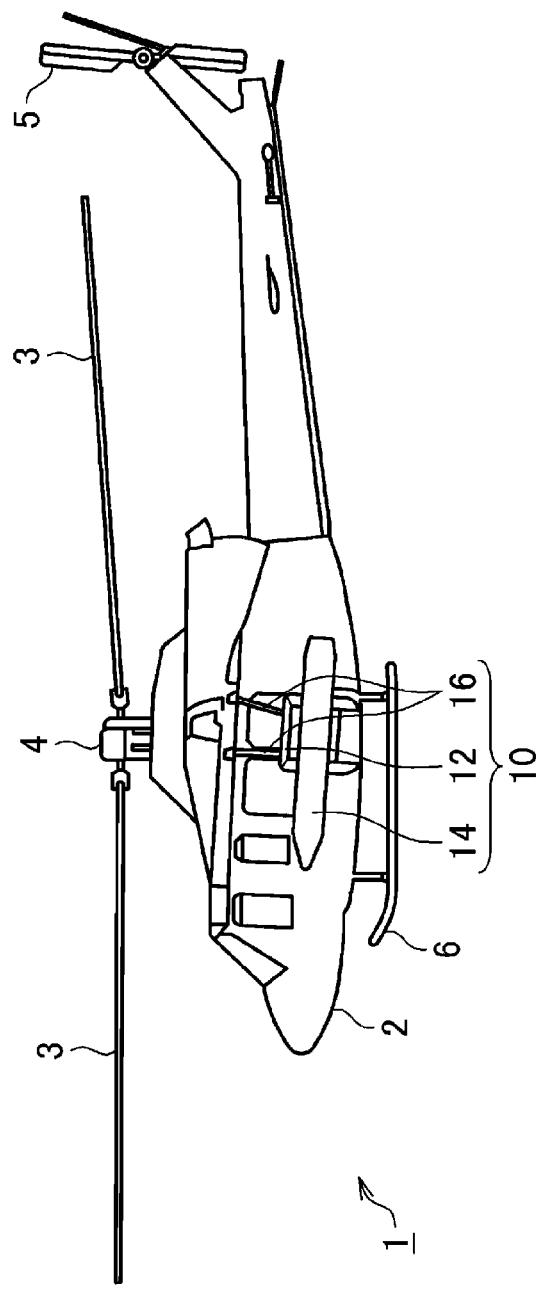
FIG. 1 is a side view illustrating a helicopter according to an embodiment of the disclosure.
Figure 2:
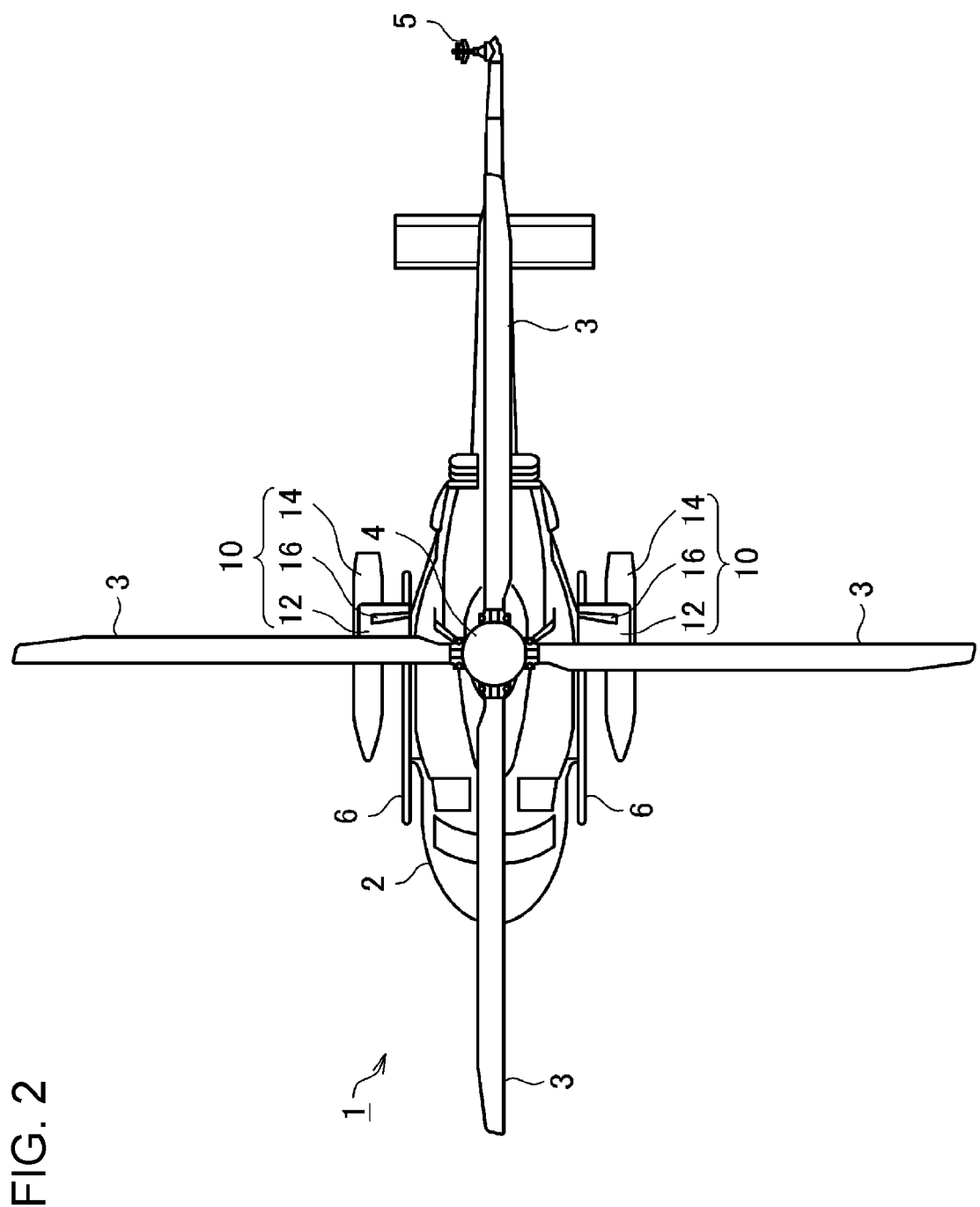
FIG. 2 is a plan view illustrating the helicopter according to the embodiment.
Figure 3:
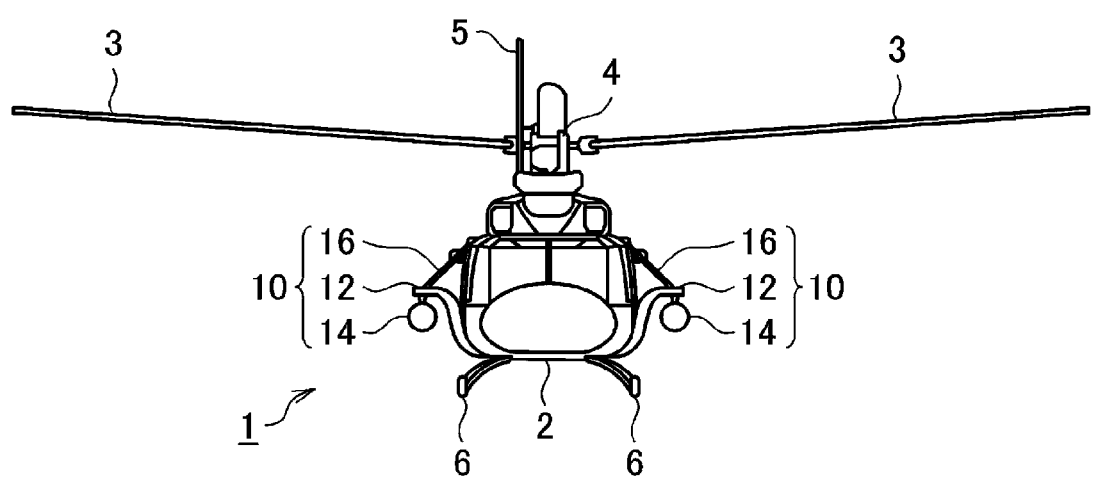
FIG. 3 is a front view illustrating the helicopter according to the embodiment.

First, referring to FIGS. 1 to 3, the schematic configuration of a helicopter 1 is described, the helicopter 1 being an example of a rotary-wing aircraft according to the embodiment of the disclosure. FIGS. 1 to 3 are a side view, a plan view, and a front view, respectively, illustrating the helicopter 1 according to the embodiment.

As illustrated in FIGS. 1 to 3, the helicopter 1 according to the embodiment includes a fuselage 2, a main rotor 4 (rotary wing) provided on the upper side of the fuselage 2 and having multiple blades 3, a tail rotor 5 provided on the rear side of the fuselage 2, and an undercarriage 6 (for example, a skid or a wheel) provided on the lower side of the fuselage 2.

The helicopter 1 according to the embodiment is, for example, a single rotor helicopter including the fuselage 2 provided with one main rotor 4. However, without being limited to this example, the helicopter may be a twin rotor helicopter with multiple main rotors (for example, a coaxial rotor helicopter, a tandem rotor helicopter, a side-by-side rotor helicopter, an intermeshing rotor helicopter, or a multi-rotor helicopter with three or more rotors).

The fuselage 2 is the body (fuselage body) of the helicopter 1. The fuselage 2 is covered with a body cover. Various driving units, such as an engine and a transmission that generate a driving force to rotate the main rotor 4, are installed inside of the fuselage 2. In addition, a control device that controls various devices mounted on the helicopter 1, a detector, a fuel tank, an operating device, and a crew cabin are installed inside of the fuselage 2, however, illustration thereof is omitted.

The main rotor 4 is a rotary wing to obtain power, such as aerodynamic lift and a moving-directional propulsive force for the helicopter 1, and is provided on the upper side of the fuselage 2. The main rotor 4 includes a rotor shaft coupled to a rotational driving force generator such as an engine, a rotor hub mounted on the rotor shaft, and multiple blades 3 radially mounted on the rotor hub. Although four blades 3 are provided in the embodiment, the number of blades may be two or greater than or equal to four.

The main rotor 4 is rotated by, for example, an engine and the trajectory surface (rotary disk surface) of multiple blades 3 is changed, and thus the aerodynamic lift and the moving-directional propulsive force for the helicopter 1 are changed. Consequently, the helicopter 1 can fly in various flight states (for example, floating, descending, hovering, forward moving, rearward moving, and turning).

2. Configuration of External Device and Mounting Mechanism

Figure 4:
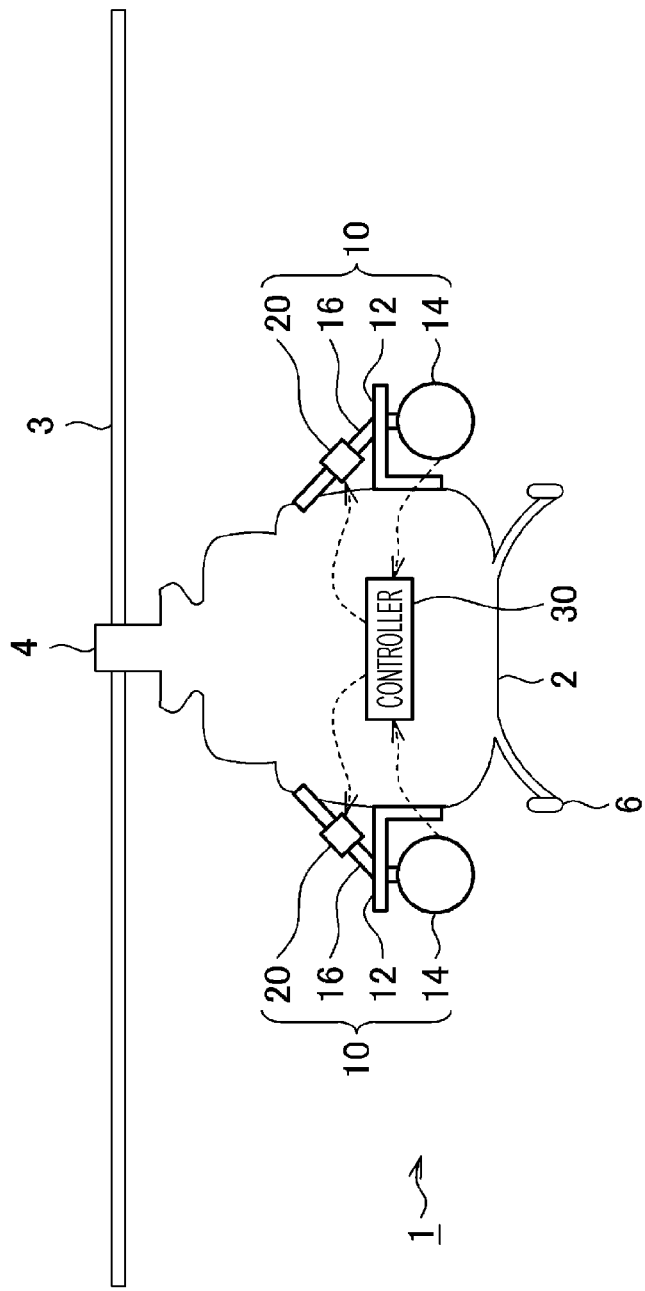
FIG. 4 is a front view schematically illustrating external devices mounted on the outside of the fuselage of the helicopter according to the embodiment.

Next, referring to FIGS. 1 to 4, the configuration of the external device 10 of the helicopter 1 according the embodiment and the mounting mechanism thereof are described. FIG. 4 is a front view schematically illustrating the external devices 10 to be mounted on the outside of the fuselage 2 of the helicopter 1 according to the embodiment.

As illustrated in FIGS. 1 to 4, the external devices 10 are mounted on the outside of the fuselage 2 of the helicopter 1. Each external device 10 is an additional device to be optionally mounted as appropriate to add an additional function to the helicopter 1. The external device 10 is detachably mounted on the outside of the fuselage 2.

Each external device 10 is disposed on the lateral side of the fuselage 2 to project outwardly of the fuselage 2 in a right-left direction. Although two external devices 10, 10 are provided on the right and left sides of the fuselage 2 in the embodiment, a single external device 10 may be provided on one side (either one of a left side or a right side) of the fuselage 2.

The external device 10 includes a mounting device 12, a mass variation device 14, and a damper 16.

The mounting device 12 is a mounting member for mounting the mass variation device 14 to the fuselage 2. The mounting device 12 is fixed to the lateral face on the lateral side (the left side or the right side) of the fuselage 2 and is disposed to project in a lateral direction of the fuselage 2. The mounting device 12 can have any shape as long as the shape allows the mass variation device 14 to be mounted. The mounting device 12 is made of a material (for example, metal materials or fiber-reinforced plastics) having strength to be able to stably support the mass variation device 14 mounted.

As illustrated in FIG. 4, the mounting device 12 according to the embodiment is made of, for example, a plate-like or frame-like member having a substantially L-shaped cross-section. One end (base side) of the mounting device 12 is fixed to a hard point of the lateral face of the fuselage 2, and the other end (mounting side) of the mounting device 12 is disposed to project laterally in a substantially horizontal direction of the fuselage 2. The mounting device 12 is disposed so as to project to the right and left sides from the fuselage 2 in this manner, and thus the mass variation device 14 can be easily mounted on the lower surface or the upper surface of the mounting device 12.

For example, an existing device (such as a stub wing) pre-installed in the helicopter 1 may be utilized as the mounting device 12. Alternatively, a fixing device, such as an adapter for mounting the mass variation device 14 may be additionally newly installed as the mounting device 12 in the fuselage 2.

In the embodiment, both right and left lateral sides of the fuselage 2 are each provided with one mounting device 12. However, the configuration is not limited to such an example. For example, one or multiple mounting devices 12 may be provided on either one of the lateral sides of the fuselage 2, or multiple mounting devices 12 may be provided on both the lateral sides of the fuselage 2.

The mass variation device 14 is an additional device mounted on the fuselage 2 and provides an additional function to the helicopter 1. The mass variation device 14 is a device whose mass varies with its use. The mass variation device 14 may be, for example, a fuel tank, a water sprayer, a fire extinguishing agent sprayer, an agricultural chemical sprayer, a storage device which stores various cargoes, or various weapons (for example, a missile launcher, a rocket launcher, a gun pod, and a mine dispersion device).

When the function of such mass variation device 14 is used during flight of the helicopter 1, the mass of the mass variation device 14 itself is decreased, and, as a result, the mass of the whole external device 10 is also decreased. For example, when the mass variation device 14 is a fuel tank, use of the fuel stored in the fuel tank during flight of the helicopter 1 causes the mass of the fuel tank to be decreased by the amount of consumption of fuel. Alternatively, when the mass variation device 14 is a water sprayer, a sprayer such as a fire extinguishing agent sprayer, or an agricultural chemical sprayer, spraying an object to be sprayed (such as water, fire extinguishing agent, pesticide) in the air during flight of the helicopter 1 causes the mass of the sprayer to be decreased by the amount of spray. Alternatively, when the mass variation device 14 is a weapon, firing a missile, a rocket, or a bullet from the weapon during flight of the helicopter 1 causes the mass of the weapon to be decreased by the mass of the fired missile, rocket, or bullet.

In the following description, an example is mainly described, in which the mass variation device 14 according to the embodiment is a fuel tank. However, the mass variation device of the disclosure is not limited to the example of a fuel tank, and may be one of the above-mentioned various devices (such as a sprayer, a storage device, and a weapon) as long as the mass variation device has a mass which varies with its use.

The mass variation device 14 is detachably mounted on the mounting device 12. Therefore, when the additional function of the mass variation device 14 is used, the mass variation device 14 is simply mounted, thus the versatility of the helicopter 1 increases, and the helicopter 1 can be reduced in weight. Alternatively, the mass variation device 14 mounted on the mounting device 12 can be replaced by one of multiple different mass variation devices 14 to be mounted on the fuselage 2, thus a variety of additional functions can be optionally added to the helicopter 1.

The damper 16 is a vibration absorption device that supports the mounting device 12 on which the mass variation device 14 mounted, and attenuates the vibration of the mounting device 12. When being displaced due to the vibration of the mounting device 12, the damper 16 generates resistance and converts the kinetic energy of the vibration into heat to attenuate the vibration. The resistance generated in the damper 16 is referred to as a damping force. For example, a hydraulic pressure damper utilizing viscous resistance of fluid such as an oil, or a magneto-rheological damper utilizing resistance of fluid, such as a magneto-rheological fluid may be used as the damper 16.

The damper 16 couples one of the right and left lateral sides of the fuselage 2 to the mounting device 12 and supports the mounting device 12. One end of the damper 16 is fixed to the lateral face of the fuselage 2, and the other end of the damper 16 is fixed to the mounting device 12. By providing such a damper 16, the vibration of the mounting device 12 can be reduced by increasing the stiffness of the mounting device 12.

From the point of view of appropriately attenuating the vibration of the external device 10 while appropriately coupling the mounting device 12 to the fuselage 2 by the damper 16, the damper 16 is, in some embodiments, made of a cylinder damper telescopic in the axial direction (longitudinal direction) of the cylinder, for example. The cylinder damper has a structure in which a tube that stores a cylinder rod and a piston is filled with fluid, such as an oil, and the fluid flows in the tube by movement of the piston according to expansion and contraction of the cylinder rod. The path of movement of the fluid is provided with a port (a hole with a small flow path area) having an orifice or a valve, viscous resistance occurs when the fluid passes through the port, and thus a damping force is obtained.

By installing such a damper 16, when the mounting device 12 on which the mass variation device 14 is mounted vibrates with respect to the fuselage 2, the damper 16 can absorb and attenuate the vibration by utilizing the viscous resistance of the fluid. In addition, the viscous resistance of the fluid can be increased or decreased by changing the flow path area of the above-mentioned port having an orifice or a valve. Thus, the damping force on the vibration by using the damper 16, in other words, the stiffness (spring constant k) of the damper 16 can be controlled.

In the embodiment, as illustrated in FIGS. 1 to 4, two dampers 16 are installed in one mounting device 12 provided on one side of the fuselage 2, and the one mounting device 12 is supported by the two dampers 16. However, without being limited to such an example, one damper 16 may be set to one mounting device 12, or three of more dampers 16 may be set to one mounting device 12.

In the embodiment, the mass variation device 14 is detachably mounted on the lower side of the mounting device 12 and is suspended by the mounting device 12. In addition, the damper 16 is disposed on the upper side of the mounting device 12. One end (the end near the fuselage 2) of the damper 16 is fixed to the lateral face of the fuselage 2 at a position higher than the mounting device 12, and the other end (the end on the outer side of the fuselage 2 in the right-left direction) of the damper 16 is fixed to the upper side (for example, the upper surface) of the mounting device 12. Thus, the damper 16 suspends from an upper position the mounting device 12 on which the mass variation device 14 is mounted and supports the mounting device 12.

In this manner, in the embodiment, the mounting structure is a structure in which the damper 16 is disposed on the upper side of the mounting device 12, and the mass variation device 14 is suspended from the lower side of the mounting device 12. With this mounting structure, the damper 16 does not interfere with operations when the mass variation device 14 is mounted or dismounted on or from the mounting device 12 or when the mass variation device 14 is used. In addition, the mass variation device 14 can be disposed on the lower side of the mounting device 12. Thus, for example, when the mass variation device 14 is a sprayer or a weapon, during flight of the helicopter 1, an object to be sprayed (such as water, pesticide, fire extinguishing agent) is easily sprayed or a weapon is easily fired from the mass variation device 14 to a position below the fuselage 2.

However, the structure is not limited to the example of the above-described mounting structure. For example, the mounting structure may be a structure in which the mass variation device 14 is disposed on the upper side of the mounting device 12, the damper 16 is disposed on the lower side of the mounting device 12, and the mounting device 12 is supported by the damper 16 from the lower side. Alternatively, the mounting structure may be a structure in which the mass variation device 14 is mounted on the front side or the rear side of the mounting device 12 which projects laterally from the fuselage 2, and the damper 16 is disposed on the upper side or the lower side of the mounting device 12.

3. Summary of Stiffness Control of Damper

Next, referring to FIG. 4, a stiffness variable mechanism 20 provided in the damper 16 according to the embodiment and a controller 30 that controls the stiffness of the damper 16 using the stiffness variable mechanism 20 are described.

As described above, during flight of the helicopter 1, the blades 3 of the main rotor 4 (rotary wing) rotate at a substantially constant number of revolutions, and vibration occurs mainly in the rotor hub, the vibration having a frequency equal to the number of revolutions multiplied by the number of the blades. As a consequence, the main rotor 4 in rotation becomes a source of vibration, and the whole fuselage of the helicopter 1 vibrates at a substantially constant frequency. In the following description, the vibration of the fuselage 2 accompanied by the rotation of the main rotor 4 is referred to as "fuselage vibration", and the frequency of the fuselage vibration is referred to as the "fuselage frequency".

Meanwhile, the natural frequency of the external device 10 mounted on the outside of the fuselage 2 is varied, for example, by the mass and stiffness of the external device 10. Here, when the mass of the mass variation device 14 included in the external device 10 is varied during flight of the helicopter 1, the natural frequency of the external device 10 is also varied in response to variation in the mass. As a consequence, the natural frequency of the external device 10 may fall within a range of resonance with the fuselage vibration (a range of frequency in which the external device 10 resonates with the fuselage vibration). In this case, the external device 10 resonates with the fuselage vibration, vibrates with a large amplitude, and thus stable flight may be obstructed.

Thus, in the embodiment, as illustrated in FIG. 4, the damper 16 is provided with the stiffness variable mechanism 20 with which the stiffness of the damper 16 is controlled in response to variation in the mass of the mass variation device 14. In addition, the controller 30 that controls the stiffness variable mechanism 20, and various sensors (not illustrated) that obtain information to be used for the control are provided in the embodiment. The sensors include, for example, a sensor that detects information on the mass of the mass variation device 14, and a sensor that obtains information on the vibration of the external device 10 including the mounting device 12 and the mass variation device 14.

The controller 30 includes, for example, an arithmetic processing unit, such as a central processing unit (CPU) or a micro processing unit (MPU), and an image processing device, such as a graphic processing unit (GPU). The arithmetic processing unit performs various arithmetic processes by executing programs stored in a memory device. Note that part or all of the arithmetic processing unit may be updatable software such as firmware or may be a program module executable by a command from a CPU.

The controller 30 controls the stiffness variable mechanism 20 and adjusts the stiffness of the damper 16 to an appropriate value, based on the results of detection made by the above-described various sensors and control information to control the mass variation device 14. The stiffness and the natural frequency of the whole external device 10 are controlled by the controller 30 in response to variation in the mass of the mass variation device 14, and thus the resonance of the external device 10 with the fuselage vibration can be reduced.

The stiffness variable mechanism 20 is a mechanism to change the stiffness of the damper 16 and is provided in the damper 16 itself. During flight of the helicopter 1, the stiffness variable mechanism 20 changes the stiffness of the damper 16 in response to variation in the mass of the mass variation device 14. For this purpose, the helicopter 1 according to the embodiment includes the controller 30 that controls the stiffness variable mechanism 20 of the damper 16. The controller 30 automatically controls the stiffness of the damper 16 by using the stiffness variable mechanism 20 in response to variation in the mass of the mass variation device 14.

Here, the stiffness of the damper 16 is the axial stiffness in the direction in which the damper 16 expands and contracts (for example, in the axial direction (longitudinal direction) of the cylinder damper). The higher the stiffness of the damper 16 is, the larger the damping force by the damper 16 on the vibration is. The lower the stiffness of the damper 16 is, the smaller the damping force by the damper 16 on the vibration is. Thus, the damping force by the damper 16 on the vibration can be changed by changing the stiffness of the damper 16.

In addition, the damper 16 couples the mounting device 12, on which the mass variation device 14 is mounted, to the fuselage 2, and supports the mounting device 12 and the mass variation device 14. Thus, the stiffness of the external device 10 mounted on the outside of the fuselage 2 (the stiffness of the whole system including the mounting device 12, the mass variation device 14, and the damper 16) is controlled by changing the stiffness of the damper 16, thereby enabling the natural frequency of the external device 10 to be controlled.

In general, the natural frequency Fn [Hz] of an object in a single-degree-of-freedom system is represented by the following Expression (1) using the mass m [kg] of the object and the stiffness (spring constant k [N/m]) of the object. The greater the stiffness (spring constant k) of the object is, the higher the natural frequency is. Also, the smaller the mass is, the higher the natural frequency is.

$$Fn = (1/2\pi) \times (k/m)^{0.5} \qquad (1)$$

During flight of the helicopter 1, when the mass of the mass variation device 14 of the external device 10 is varied due to use of the mass variation device 14, the natural frequency of the external device 10 may change and may fall within the resonance range with the fuselage vibration. Thus, in some embodiments, the natural frequency of the external device 10 is controlled in response to variation in the mass of the mass variation device 14 so that the natural frequency of the external device 10 falls outside the resonance range. Consequently, the vibration of the external device 10 can be prevented from resonating with the fuselage vibration.

For example, a case is discussed where the mass variation device 14 of the external device 10 is a fuel tank. In the case where the stiffness of the damper 16 remains substantially constant, when the mass of the fuel tank is decreased by use of the fuel in the fuel tank, the natural frequency of the external device 10 is gradually increased in response to the decrease of the mass. As a consequence, the natural frequency of the external device 10 may fall within the resonance range with the fuselage vibration, and the external device 10 may resonate.

In contrast, in the embodiment, the controller 30 reduces the stiffness (spring constant k) of the damper 16 in response to decrease in the mass of the fuel tank by controlling the stiffness variable mechanism 20. Thus, the natural frequency of the external device 10 can be maintained at a substantially constant value by reducing the increase in the natural frequency. Therefore, even when the mass of the fuel tank is varied, the natural frequency of the external device 10 can be controlled so as to fall outside the resonance range, thus resonance between the external device 10 and the fuselage vibration can be prevented.

In this manner, the controller 30 according to the embodiment controls the natural frequency of the external device 10 to fall outside the resonance range by controlling the stiffness of the damper 16 in response to variation in the mass of the mass variation device 14. For this purpose, the controller 30 obtains information on the vibration of the external device 10 or information on the mass of the mass variation device 14, and detects a factor of variation in the natural frequency of the external device 10. The controller 30 then automatically controls the stiffness of the damper 16 based on the obtained information on the vibration of the external device 10 or information on the mass of the mass variation device 14.

Here, first, the information on the vibration of the external device 10 and control of the stiffness of the damper 16 based on the information are described.

The information on the vibration of the external device 10 indicates the vibration state of the external device 10 which actually vibrates during flight of the helicopter 1, and includes information indicating the frequency and amplitude of the external device 10, for example. The frequency of the external device 10 can be measured with a vibration sensor by installing the vibration sensor at a predetermined position of the external device 10 (for example, a predetermined position of the mounting device 12 or the mass variation device 14), for example. Examples of the vibration sensor include a well-known sensor, such as a displacement sensor (for example, a capacitive, eddy-current, or optical displacement sensor), an acceleration sensor (for example, a piezoelectric, conductive, or strain gauge sensor), or a speed sensor (for example, a conductive speed sensor).

The frequency or the like of the external device 10 is continuously or intermittently measured by the vibration sensor during flight of the helicopter 1, and is output to the controller 30. The controller 30 controls the stiffness of the damper 16 based on the variation in the frequency of the external device 10 measured by and received from the vibration sensor. For example, when the frequency of the external device 10 is likely to fall within the resonance range, the controller 30 simply increases or decreases the stiffness of the damper 16 so that the frequency of the external device 10 deviates from the resonance range.

In this manner, the stiffness of the damper 16 can be automatically controlled by directly measuring the frequency of the external device 10 by using the vibration sensor provided in the external device 10. The frequency of the above-described fuselage vibration caused by the main rotor 4 is not a completely fixed value, and may vary to some extent according to, for example, flight conditions. In such a case, in some embodiments, the frequency of the external device 10 is directly measured by the vibration sensor, and the measured frequency is reflected on stiffness control of the damper 16. Consequently, even when the frequency of the fuselage vibration is varied according to flight conditions, and the natural frequency of the external device 10 is changed in response to the variation in the mass of the mass variation device 14, the natural frequency can be prevented from falling within the resonance range with the fuselage vibration.

Next, information on the mass of the mass variation device 14 and the control of the stiffness of the damper 16 based on the information are described.

The information on the mass of the mass variation device 14 may directly indicate, for example, the mass itself of the mass variation device 14, or may indirectly indicate the mass of the mass variation device 14. When the information directly indicating the mass itself of the mass variation device 14 is to be obtained, the mass of the mass variation device 14 can be directly measured, for example, by providing a mass meter that measures the mass of the mass variation device 14.

On the other hand, the information indirectly indicating the mass of the mass variation device 14 may indicate, for example, the remaining amount or the consumed amount of objects (for example, the fuel in the fuel tank, the sprayed object of a sprayer, the cargo of the storage device, fired objects such as a missile or a rocket of a weapon) which are factors of variation in the mass in the mass variation device 14. If such information indirectly indicating the mass of the mass variation device 14 is obtainable, the controller 30 can estimate and calculate the mass of the mass variation device 14 by processing the information, and also can estimate the natural frequency of the external device 10 corresponding to the mass. Thus, correlation between the information (for example, the remaining amount of fuel in the fuel tank) indirectly indicating the mass of the mass variation device 14 and the natural frequency of the external device 10 is measured in advance, and the controller 30 may hold a table indicating the correlation.

Thus, the controller 30 obtains from the mass variation device 14 the information indirectly indicating the mass of the mass variation device 14 during flight of the helicopter 1, and thereby can estimate the variation in the natural frequency of the external device 10 based on the information. Therefore, when the natural frequency of the external device 10 is changed in response to variation in the mass of the mass variation device 14, the controller 30 may increase or decrease the stiffness of the damper 16 so that the natural frequency does not fall within the resonance range.

As described above, the controller 30 obtains information on the vibration of the external device 10 or information indicating the mass of the mass variation device 14 during flight of the helicopter 1. The controller 30 then automatically controls the stiffness of the damper 16 based on the information in response to variation in the mass of the mass variation device 14. At this point, the controller 30 generates a control signal to control the stiffness variable mechanism 20 of the damper 16 and outputs the signal to the stiffness variable mechanism 20. The stiffness variable mechanism 20 changes the stiffness (damping force) of the damper 16 based on the control signal.

In this control, the controller 30 increases or decreases the stiffness of the damper 16 in response to variation in the mass of the mass variation device 14 so that the natural frequency of the external device 10 falls outside the resonance range with the fuselage vibration. Thus, even when the mass of the mass variation device 14 is varied during flight of the helicopter 1, the natural frequency of the external device 10 can be adjusted so as to deviate from the resonance range, thus the external device 10 can be prevented from resonating with the fuselage vibration.

4. Specific Examples of Stiffness Variable Damper

Figure 5:
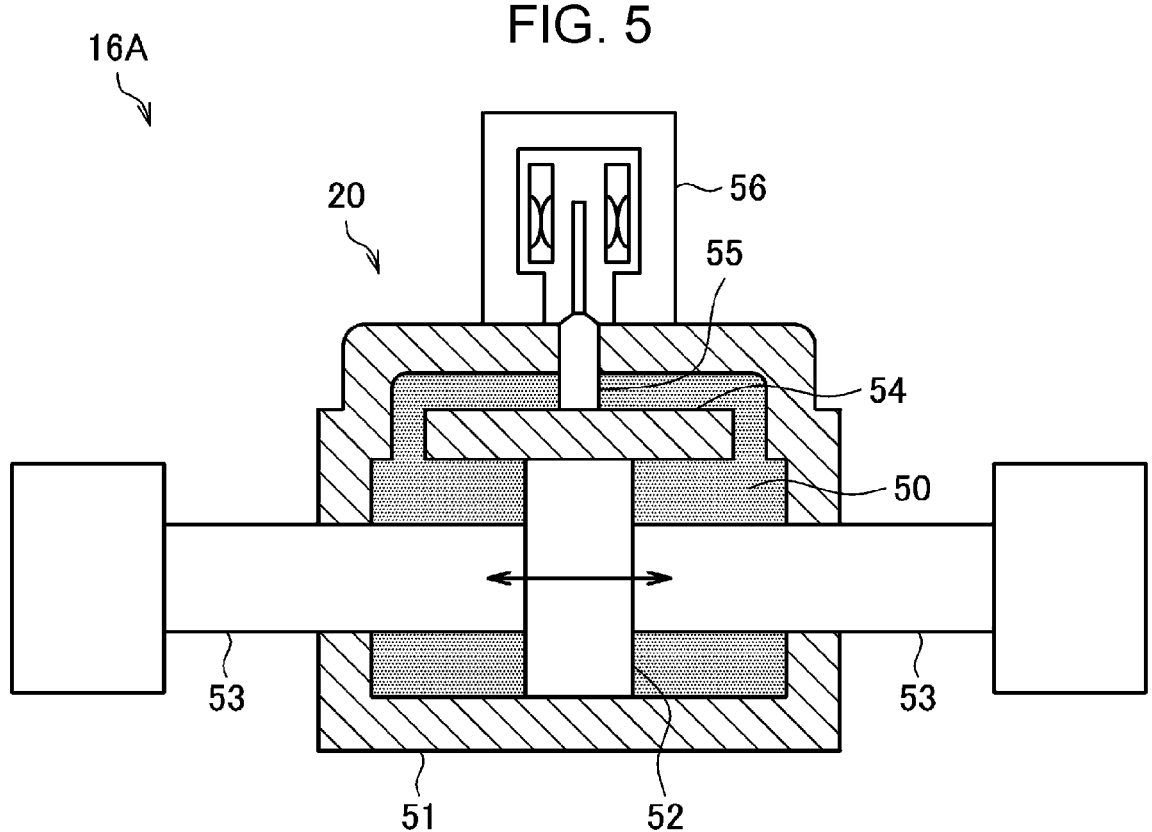
FIG. 5 is a schematic diagram illustrating an example of a hydraulic damper including a stiffness variable mechanism according to the embodiment.
Figure 6:
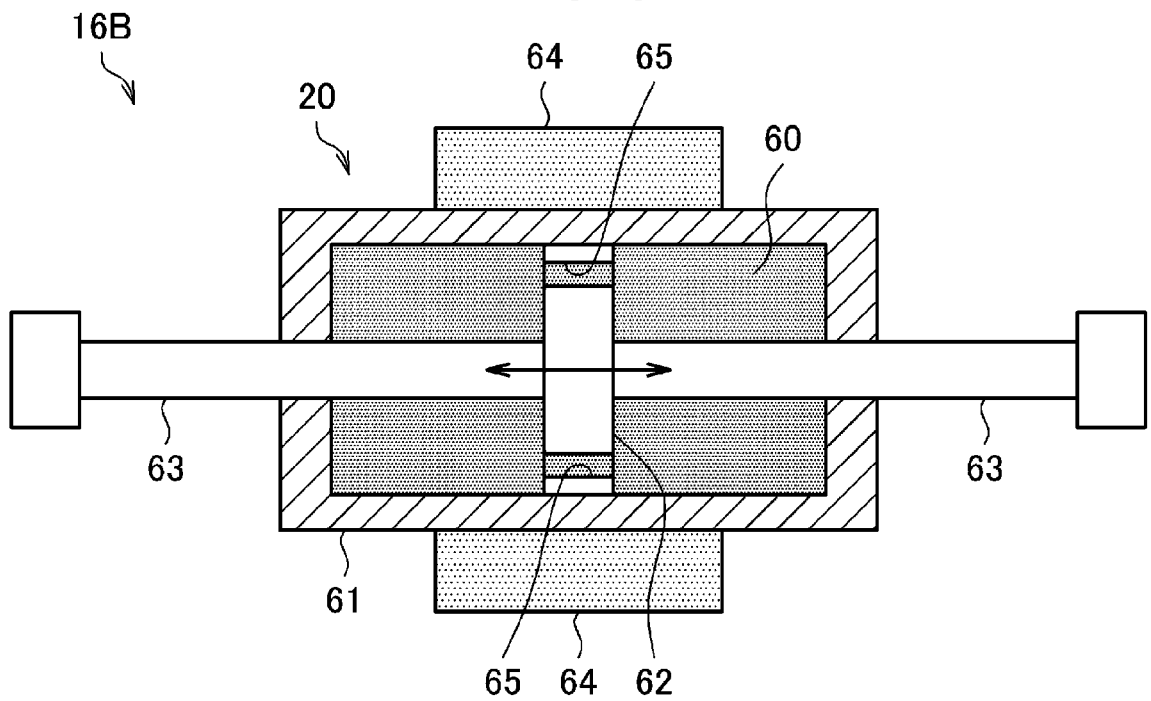
FIG. 6 is a schematic diagram illustrating an example of a magneto-rheological damper including the stiffness variable mechanism according to the embodiment.

Next, referring to FIGS. 5 and 6, specific examples of the damper 16 (shock absorber) including the stiffness variable mechanism 20 according to the embodiment are described. FIG. 5 is a schematic diagram illustrating an example of a hydraulic damper 16A including the stiffness variable mechanism 20 according to the embodiment. FIG. 6 is a schematic diagram illustrating an example of a magnetorheological damper 16B including the stiffness variable mechanism 20 according to the embodiment.

(1) Hydraulic Damper System

First, referring to FIG. 5, an example of the hydraulic damper 16A, stiffness of which is variable, is described. As illustrated in FIG. 5, the hydraulic damper 16A includes a cylinder 51, a piston 52, a rod 53, a flow path 54, an orifice 55, and an opening/closing valve 56.

Viscous fluid 50 (such as an oil) having a predetermined viscosity is sealed in the cylinder 51. The piston 52 and the rod 53 are provided in the cylinder 51 and reciprocate in the axial direction. The flow path 54 for moving the viscous fluid 50 is provided at a location adjacent to the space where the piston 52 and the rod 53 reciprocate in the cylinder 51. The flow path 54 is provided with the orifice 55.

The orifice 55 is a gap provided in the middle of the flow path 54, and serves as a flow path of the viscous fluid 50. The flow path area of the viscous fluid 50 in the flow path 54 is determined by the diameter of the orifice 55 (hereinafter referred to as the orifice diameter). The opening/closing valve 56 is installed at a position adjacent to the position of the orifice 55 installed in the flow path 54. The opening/closing valve 56 is a valve (for example, an electromagnetic valve) for adjusting the orifice diameter by opening or closing the orifice 55. The opening/closing valve is electrically coupled to the controller 30 (see FIG. 4) and is controlled to open or close by the controller 30.

Changing the orifice diameter by the opening/closing valve enables the viscous resistance of the viscous fluid 50 passing through the orifice 55 to be changed, and thus the stiffness of the hydraulic damper 16A can be changed. In one example, the viscous resistance of the viscous fluid 50 is increased by decreasing the orifice diameter, and thus the stiffness of the hydraulic damper 16A is increased. In contrast, the viscous resistance of the viscous fluid 50 is decreased by increasing the orifice diameter, and thus the stiffness of the hydraulic damper 16A is decreased. As described above, in the hydraulic damper 16A illustrated in FIG. 5, the mechanism to change the orifice diameter by the opening/closing valve 56 serves as the stiffness variable mechanism 20 that makes the stiffness (damping force) of the hydraulic damper 16A variable.

(2) Magneto-Rheological Damper System

Next, referring to FIG. 6, an example of the magneto-rheological damper 16B, stiffness of which is variable, is described. As illustrated in FIG. 6, the magneto-rheological damper 16B includes a cylinder 61, a piston 62, a rod 63, an electric magnet 64, and an orifice 65.

A magnetic fluid 60 is sealed in the cylinder 61. The magnetic fluid 60 (MR fluid) is a fluid in which magnetic particles are dispersed in an oil, for example. When a magnetic field is applied to the magnetic fluid 60, magnetic particles form a cluster according to a magnetic field strength, and the viscous resistance of the magnetic fluid 60 is increased by MR effect. Like this, the magnetic fluid 60 has such a characteristic that in response to a magnetic field, its viscosity changes according to a magnetic field strength.

The piston 62 and the rod 63 provided in the cylinder 61 reciprocate in the axial direction. The orifice 65, through which the magnetic fluid 60 flows, is formed through the piston 62. When the piston 62 and the rod 63 move in the cylinder 61, the magnetic fluid 60 flows through the orifice 65 between one side and the other side of the piston 62.

The electric magnet 64 is disposed on the outside of the cylinder 61 and includes a coil which generates a magnetic field. The electric magnet 64 applies the generated magnetic field to the magnetic fluid 60 in the cylinder 61. The electric magnet 64 is electrically coupled to the controller 30 (see FIG. 4), and the voltage applied to the coil is controlled by the controller 30. The magnetic field strength generated from the electric magnet 64 can be changed by changing the voltage to be applied to the coil of the electric magnet 64. Changing the magnetic field strength of the electric magnet 64 enables the state of the magnetic fluid 60 in the cylinder 61 to be changed between a liquid state and a semisolid state, and thus the viscous resistance of the magnetic fluid 60 can be changed.

Thus, changing the magnetic field strength of the electric magnet 64 enables the viscous resistance of the magnetic fluid 60 to be changed, thus the stiffness of the magneto-rheological damper 16B can be changed. In one example, the voltage to be applied to the coil of the electric magnet 64 is increased to increase the magnetic field strength, thus the viscous resistance of the magnetic fluid 60 is increased, and the stiffness of the magneto-rheological damper 16B is increased. On the other hand, the voltage to be applied to the coil of the electric magnet 64 is decreased to decrease the magnetic field strength, thus the viscous resistance of the magnetic fluid 60 is decreased, and the stiffness of the magneto-rheological damper 16B is decreased. As described above, in the magneto-rheological damper 16B illustrated in FIG. 6, the mechanism to change the magnetic field strength applied to the magnetic fluid 60 by the electric magnet 64 serves as the stiffness variable mechanism 20 that makes the stiffness (damping force) of the magneto-rheological damper 16B variable.

5. Specific Examples of Control of Natural Frequency of External Device

Figure 7:
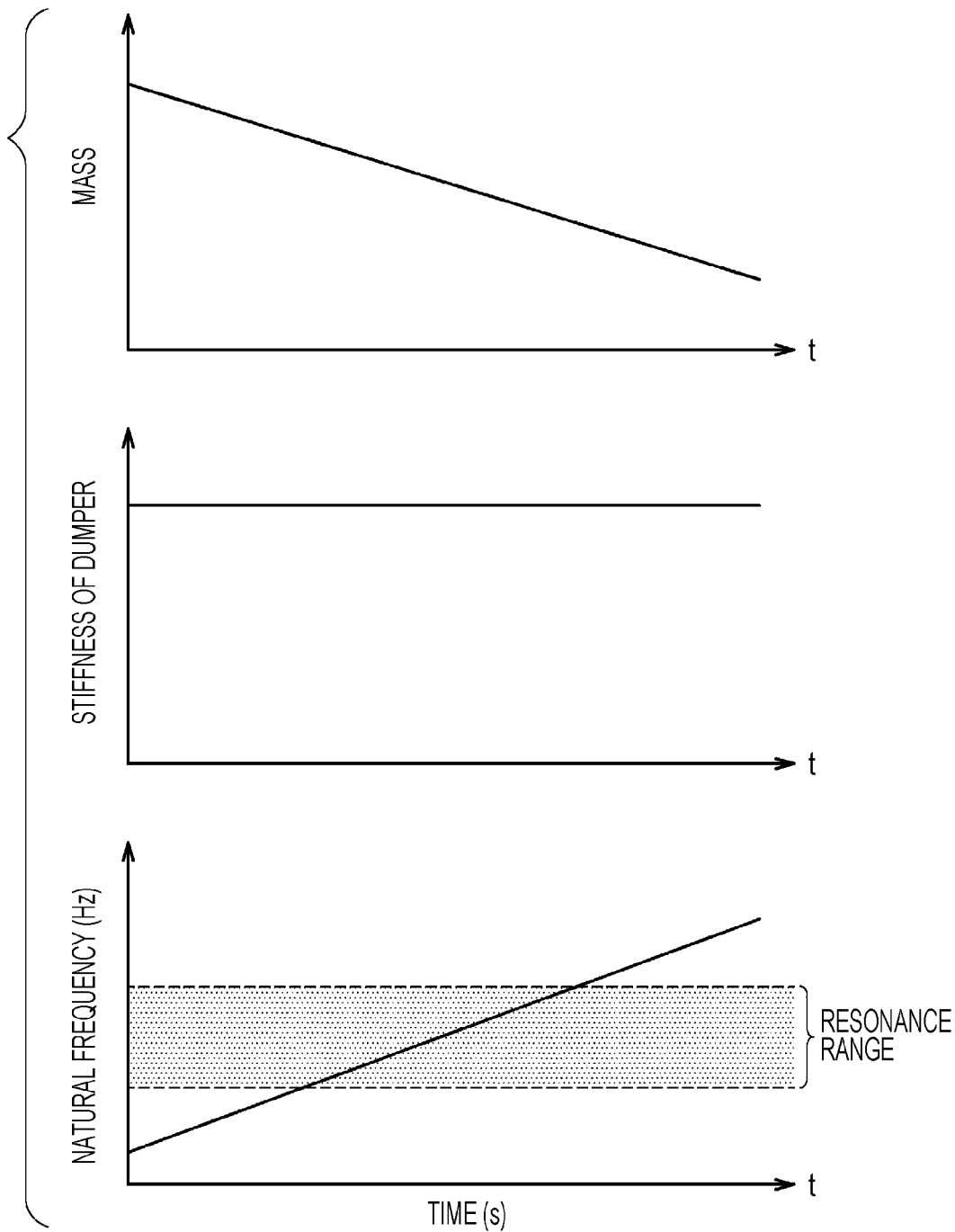
FIG. 7 is a timing chart illustrating a variation of the natural frequency of an external device when the stiffness of the damper is not controlled according to a reference example.
Figure 8:
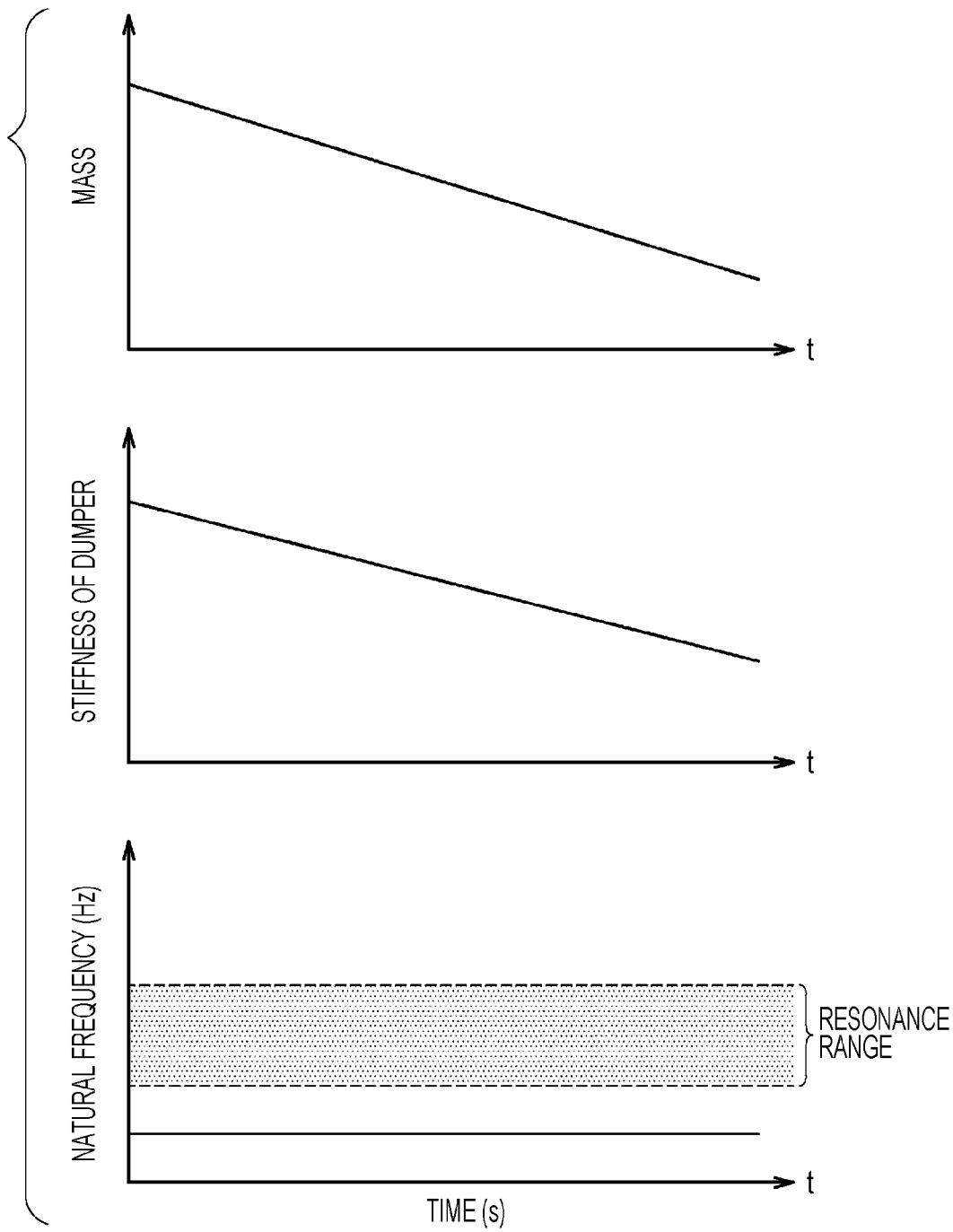
FIG. 8 is a timing chart illustrating a variation of the natural frequency of an external device when the stiffness of the damper is controlled by a controller according to the embodiment.
Figure 9:
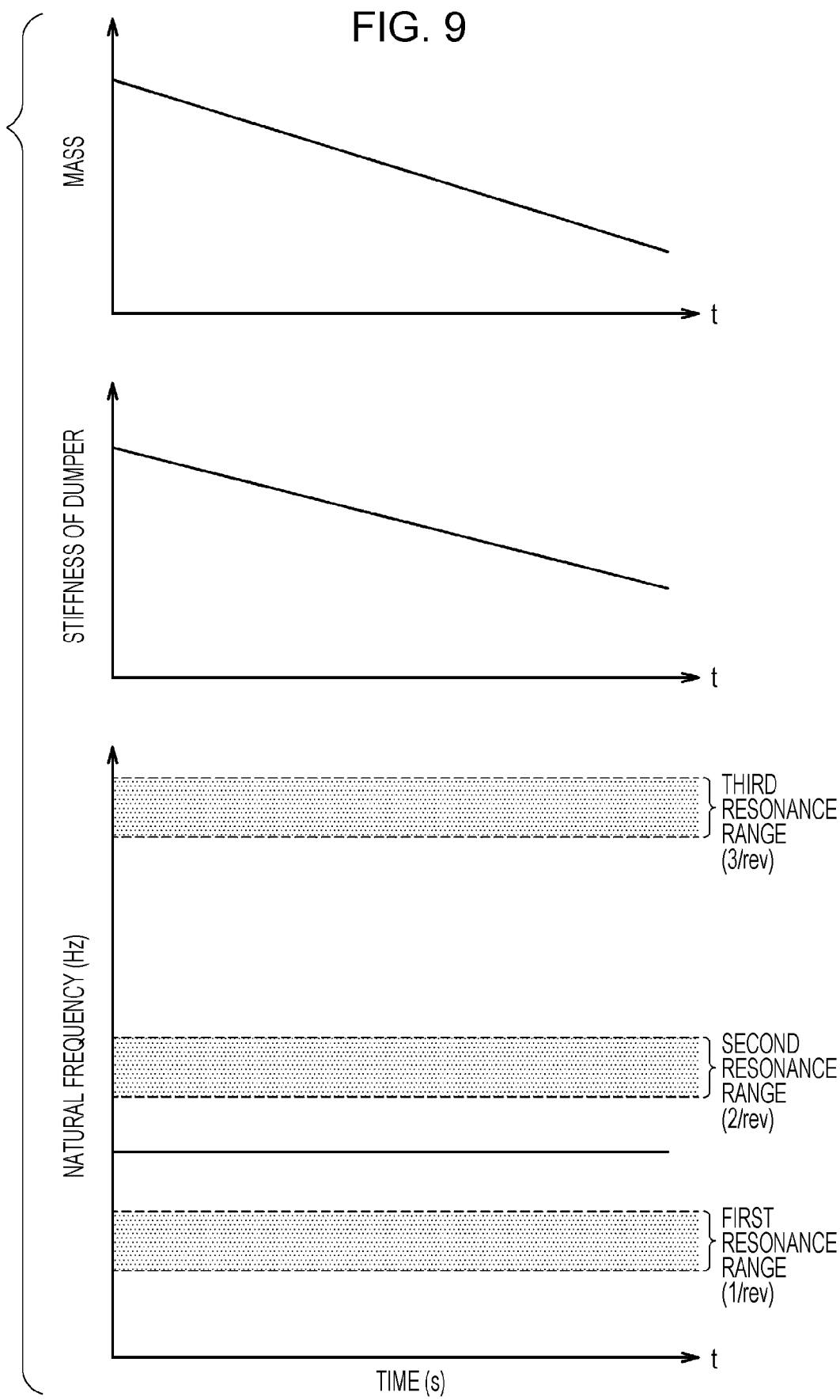
FIG. 9 is a timing chart illustrating a variation of the natural frequency of an external device when the stiffness of the damper is controlled by a controller according to the embodiment.

Next, referring to FIGS. 7 to 9, specific examples of a method of controlling the natural frequency of the external device 10 by controlling the stiffness of the damper 16 by using the controller 30 according to the embodiment is described.

FIG. 7 is a timing chart illustrating a reference example of a variation of the natural frequency of the external device 10 when the stiffness of the damper 16 is not controlled. FIGS. 8 and 9 are each a timing chart illustrating a variation of the natural frequency of the external device 10 when the stiffness of the damper 16 is controlled by the controller 30 according to the embodiment.

As illustrated in FIG. 7, when the mass of the mass variation device 14 is varied as a result of using the mass variation device 14 during flight of the helicopter 1, the natural frequency of the external device 10 is changed in response to variation of mass, and may fall within the resonance range with the fuselage vibration.

Here, as in the reference example of FIG. 7, a case is discussed where the stiffness of the damper 16 is maintained at a substantially constant value without controlling the stiffness of the damper 16 in response to variation of the mass. In this case, as illustrated in FIG. 7, when the mass of the mass variation device 14 is gradually decreased during flight of the helicopter 1, the natural frequency of the external device 10 is gradually increased in response to the decrease of the mass. As a consequence, the natural frequency of the external device 10 falls within the resonance range with the fuselage vibration, and the external device 10 resonates with the fuselage vibration.

In contrast, in the embodiment, as illustrated in FIG. 8, the stiffness of the damper 16 is controlled in response to variation in the mass of the mass variation device 14. In one example, when the mass of the mass variation device 14 is large because the mass variation device 14 has not been used, the controller 30 controls the stiffness of the damper 16 at a high value according to the large mass. Thus, at the start of flight of the helicopter 1, the natural frequency of the external device 10 is set to a predetermined value lower than the resonance range, and resonance between the external device 10 and the fuselage vibration can be avoided. When the mass of the mass variation device 14 is decreased because the mass variation device 14 is used during flight of the helicopter 1, the controller 30 gradually reduces the stiffness of the damper in response to the decrease of the mass of the mass variation device 14. Thus, increase of the natural frequency of the external device 10 is avoided, and the natural frequency of the external device 10 can be maintained at a substantially constant value in a band lower than the resonance range. Therefore, even when the mass of the mass variation device 14 is varied, the natural frequency of the external device 10 can be controlled so as to fall outside the resonance range, and thus resonance between the external device 10 and the fuselage vibration can be prevented.

FIG. 9 further illustrates the control when multiple resonance ranges are present between the external device 10 and the fuselage vibration. As illustrated in FIG. 9, multiple resonance ranges may be present near the band which is one time, two times, four times, of the fuselage frequency accompanied by the rotation of the main rotor 4. In FIG. 9, an example is illustrated in which there are three resonance ranges: a first resonance range, a second resonance range, and a third resonance range. When multiple resonance ranges are present stepwise in this manner, in some embodiments, the stiffness of the damper 16 is controlled so that the natural frequency of the external device 10 does not fall within any of the multiple resonance ranges.

Thus, the controller 30 according to the embodiment controls the stiffness of the damper 16 in response to variation in the mass of the mass variation device 14 so that the natural frequency of the external device 10 deviates from any of the multiple resonance ranges. In the example of FIG. 9, the stiffness of the damper 16 is controlled at a lower level in response to decrease in the mass of the mass variation device 14, and thus the natural frequency of the external device 10 is controlled at a substantially constant value in a band between the first resonance range and the second resonance range.

In one example, as illustrated in FIG. 9, when the mass of the mass variation device 14 is large, the natural frequency of the external device 10 is adjusted to a substantially intermediate value between the first resonance range and the second resonance range by setting the stiffness of the damper 16 high. As the mass of the mass variation device 14 is decreased due to its use during flight of the helicopter 1, the stiffness of the damper 16 is gradually reduced. Thus, increase in the natural frequency of the external device 10 is avoided, the natural frequency is maintained at a substantially constant value higher than the first resonance range and lower than the second resonance range, and thus the natural frequency is controlled so as not to fall within the first resonance range or the second resonance range. Thus, even when the weight of the mass variation device 14 is varied, the natural frequency of the external device 10 can be appropriately controlled so as to deviate from any of the multiple resonance ranges.

As illustrated in FIGS. 8 and 9 above, the controller 30 according to the embodiment controls the stiffness of the damper 16 in response to variation in the mass of the mass variation device 14, and thus the natural frequency of the external device 10 is controlled so as to deviate from each resonance range. For example, when the natural frequency of the external device 10 approaches a predetermined threshold range toward a resonance range due to variation in the mass of the mass variation device 14, the controller 30 controls the stiffness of the damper 16 so that the natural frequency deviates from the resonance range. Thus, the external device 10 can be prevented from resonating with the fuselage vibration caused by the rotation of the main rotor 4.

From the simple point of view of avoiding the resonance of the external device 10, a method of setting the stiffness of the damper 16 to a high value all the time may also be considered. However, when the stiffness of the damper 16 is set high, a problem arises in that the fuselage stiffness exceeds normal specifications, and the mass of the helicopter 1 is also increased. Thus, as in the control method according to the embodiment, a method for preventing resonance of the external device 10 is used in some embodiments, the method including changing the stiffness of the damper 16 when appropriate in response to variation in the mass of the mass variation device 14. Consequently, the fuselage stiffness can be prevented from exceeding normal specifications, and the mass of the helicopter 1 can be controlled at a low level.

In addition, as another method for avoiding resonance of the external device 10, an active vibration damping device may be installed in the external device 10. However, the active vibration damping device has a disadvantage in that the energy consumption is high, and the energy efficiency is low. In contrast, the control method according to the embodiment does not use an active vibration damping device, and the damper 16 is simply provided with the stiffness variable mechanism 20. Thus, the energy consumption is low, and the device configuration is simple according to the control method of the embodiment.

6. Control Flow

Figure 10:
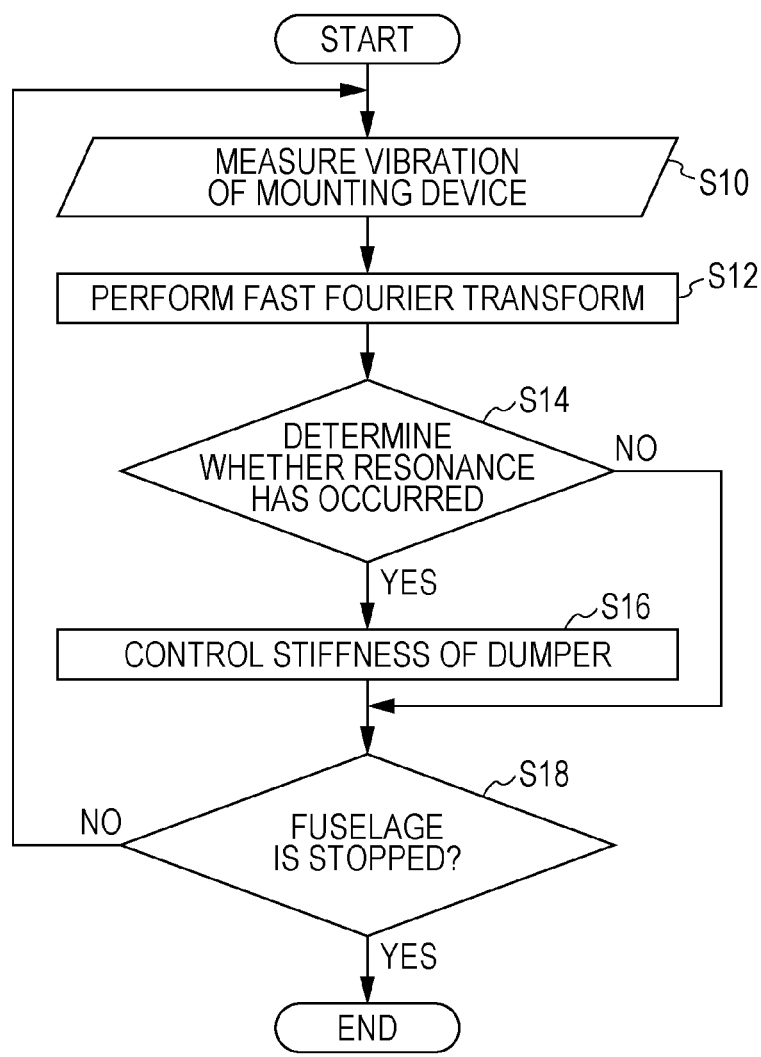
FIG. 10 is a flowchart illustrating a method of controlling the stiffness of the damper by the controller according to the embodiment.

Next, referring to FIG. 10, a specific example of flow to control the stiffness of the damper 16 by the controller 30 according to the embodiment is described. FIG. 10 is a flowchart illustrating a method of controlling the stiffness of the damper 16 by the controller 30 according to the embodiment.

As illustrated in FIG. 10, during flight of the helicopter 1, the controller 30 measures the vibration of the external device 10 (S10), determines based on the measurement result whether resonance of the external device 10 has occurred (S12, S14), and controls the stiffness of the damper 16 as appropriate (S16). Such processing S10 to S16 is continued and repeatedly performed until the fuselage 2 of the helicopter 1 is stopped (S18).

Figure 11:
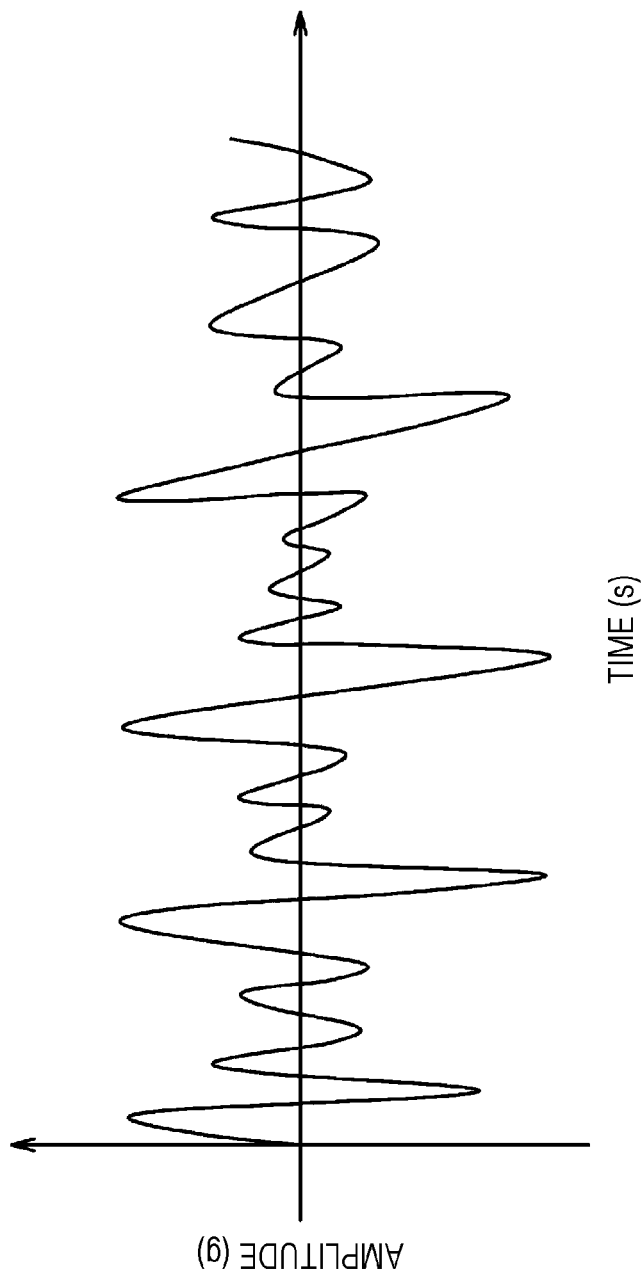
FIG. 11 is a graph illustrating a specific example of amplitude data for every time interval according to the embodiment.

In one example, first, during flight of the helicopter 1, the controller 30 measures the vibration of the mounting device of the external device 10 by a sensor, and obtains information which indicates the vibration (S10). For example, the controller 30 obtains amplitude data for every time interval from an accelerometer installed in the mounting device 12. A specific example of amplitude data for every time interval is illustrated in FIG. 11. As illustrated in FIG. 11, the amplitude data is information indicating actual vibration (temporal variation of amplitude) of the mounting device 12 during flight of the helicopter 1.

Figure 12:
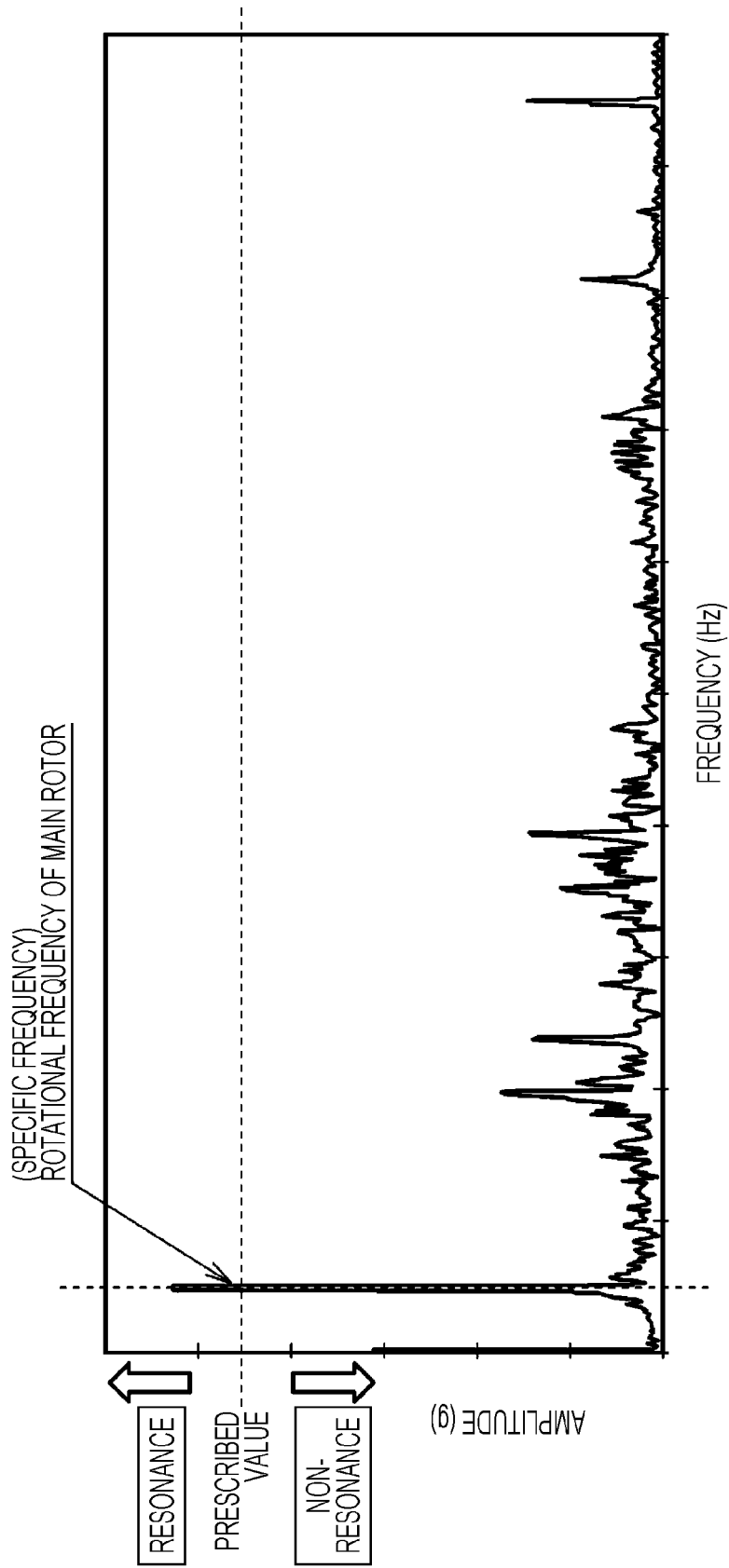
FIG. 12 is a graph illustrating a specific example of amplitude data for every frequency interval according to the embodiment.

Next, the controller 30 performs fast Fourier transform (FFT) on the amplitude data for every time interval obtained in S10, thereby deriving amplitude data for every frequency interval (S12). A specific example of the amplitude data for every frequency interval is illustrated in FIG. 12. As illustrated in FIG. 12, a peak of amplitude is observed in some frequencies, and a peak with a large amplitude is observed, particularly, in a specific frequency in a low-frequency band.

Subsequently, the controller 30 determines whether the external device 10 resonates with the fuselage vibration based on the amplitude data for every frequency interval obtained in S12 (S14). For example, as illustrated in FIG. 12, the controller 30 determines whether the external device 10 has resonated with the fuselage vibration based on whether the amplitude value, for example, in the above-mentioned specific frequency (the rotational frequency of the main rotor 4; fuselage frequency) has exceeded a predetermined prescribed value. Here, the prescribed value is a threshold for determining whether the external device 10 is in a resonance state or a non-resonance state.

As illustrated in FIG. 12, for example, when the amplitude value at the above-mentioned specific frequency is greater than a prescribed value, the controller 30 determines the external device 10 to be in a resonance state, and controls the stiffness of the damper 16 in S16. However, when the amplitude value at the above-mentioned specific frequency is less than or equal to the prescribed value, the controller 30 determines the external device 10 to be in a non-resonance state. In this case, stiffness control processing of the damper 16 in S16 is not performed, and the above-described processing in S10 to S14 is repeated until the fuselage is stopped (S18).

When the external device 10 is determined to be in a resonance state in S14, the controller 30 eliminates the resonance state by controlling the stiffness of the damper 16 (S16). For example, a predetermined threshold (for example, a prescribed value illustrated in FIG. 12) is set to the amplitude value at specific frequencies, and when the amplitude value at a specific frequency obtained in S12 exceeds the threshold, the controller 30 controls the stiffness variable mechanism 20 so that the stiffness of the damper 16 is decreased. As a consequence, when the subsequently measured amplitude value at the specific frequency falls below the threshold due to gradual reduction in the stiffness of the damper 16, the controller 30 stops the control of the stiffness of the damper 16. Thus, the amplitude value of the vibration of the external device 10 can be controlled at a predetermined threshold or less, and the resonance state of the external device 10 with respect to the fuselage vibration can be eliminated.

More particularly, for example, when the mass variation device 14 is a fuel tank and the fuel in the fuel tank is decreased every second during flight of the helicopter 1, the natural frequency of the external device 10 is increased due to the decrease in the mass of the fuel tank. As a consequence, the natural frequency of the external device 10 is increased and falls within the resonance range, and thus the external device 10 resonates with the fuselage vibration at the specific frequency caused by the main rotor 4. Thus, when the mass of the fuel tank is decreased, the controller 30 according to the embodiment controls the stiffness variable mechanism 20 to reduce the stiffness of the damper 16, and decreases the natural frequency of the external device 10. Thus, the natural frequency of the external device 10 can be maintained at a low frequency before the decrease in the mass of the fuel tank, and can be outside the resonance range, and thus resonance of the external device 10 can be prevented.

Although an embodiment of the disclosure has been described above with reference to the accompanying drawings, it is needless to say that the disclosure is not limited to such an embodiment. It is apparent that various modifications and alterations may occur to those skilled in the art in the category described in claims, and it is understood that these also naturally belong to the technical scope of the disclosure.

For example, in the embodiment, an example has been described in which the rotary-wing aircraft is the helicopter 1. However, the disclosure is not limited to such an example. The rotary-wing aircraft of the disclosure may be, for example, a vertical take-off and landing (VTOL) aircraft, a gyroplane, a gyrodyne, or a drone as long as the aircraft obtains the main aerodynamic lift by one or more rotary wings. In addition, the rotary-wing aircraft may be a manned aircraft or an unmanned aircraft.

Also, in the embodiment, an example, in which the mass variation device 14 is a fuel tank, has been mainly described. However, the disclosure is not limited to such an example. The mass variation device of the disclosure may be any one of other various devices which can be mounted on a rotary-wing aircraft, such as the above-mentioned water sprayer, fire extinguishing agent sprayer, agricultural chemical sprayer, a transport device, or various weapons, provided that the mass of the mass variation device is varied as it is used.

According to the disclosure, it is possible to avoid the resonance of the external device with fuselage vibration even when the mass of the external device mounted on the outside of the fuselage of the rotary-wing aircraft is varied.

The invention claimed is:

1. A rotary-wing aircraft comprising:
a fuselage provided with a rotary wing;
an external device mounted on an outside of the fuselage; and
a controller disposed in the fuselage, wherein:
the external device comprises:
a mounting device fixed to the fuselage and disposed so as to project in a lateral direction of the fuselage,
a mass variation device mounted on the mounting device, the mass variation device having mass that varies as the mass variation device is used during flight of the rotary-wing aircraft, and
a damper coupling the fuselage to the mounting device,
the damper supports the mounting device during the flight, and
the damper comprises a stiffness variable mechanism configured to change stiffness of the damper in response to variation in the mass of the mass variation device during the flight, and
the controller is configured to control the stiffness of the damper with the stiffness variable mechanism in response to the variation in the mass of the mass variation device.

2. The rotary-wing aircraft according to claim 1, wherein the controller is configured to control the stiffness of the damper such that a natural frequency of the external device deviates from a range of frequency in which the external device resonates with vibration of the fuselage.

3. The rotary-wing aircraft according to claim 1, wherein the controller is configured to control the stiffness of the damper such that the stiffness of the damper decreases in response to decrease in the mass of the mass variation device.

4. The rotary-wing aircraft according to claim 2, wherein the controller is configured to control the stiffness of the damper such that the stiffness of the damper decreases in response to decrease in the mass of the mass variation device.

5. The rotary-wing aircraft according to claim 1, wherein the controller is configured to control the stiffness of the damper on a basis of information on vibration of the external device.

6. The rotary-wing aircraft according to claim 2, wherein the controller is configured to control the stiffness of the damper on a basis of information on vibration of the external device.

7. The rotary-wing aircraft according to claim 3, wherein the controller is configured to control the stiffness of the damper on a basis of information on vibration of the external device.

8. The rotary-wing aircraft according to claim 4, wherein the controller is configured to control the stiffness of the damper on a basis of information on vibration of the external device.

9. The rotary-wing aircraft according to claim 1, wherein the controller is configured to control the stiffness of the damper on a basis of information on the mass of the mass variation device.

10. The rotary-wing aircraft according to claim 2, wherein the controller is configured to control the stiffness of the damper on a basis of information on the mass of the mass variation device.

11. The rotary-wing aircraft according to claim 3, wherein the controller is configured to control the stiffness of the damper on a basis of information on the mass of the mass variation device.

12. The rotary-wing aircraft according to claim 4, wherein the controller is configured to control the stiffness of the damper on a basis of information on the mass of the mass variation device.

13. A rotary-wing aircraft comprising:
a fuselage provided with a rotary wing; and
an external device mounted on an outside of the fuselage, wherein:
the external device comprises:
 a mounting device fixed to the fuselage and disposed so as to project in a lateral direction of the fuselage,
 a mass variation device mounted on the mounting device, the mass variation device having mass that varies as the mass variation device is used during flight of the rotary-wing aircraft, and
 a damper coupling the fuselage to the mounting device, the damper supports the mounting device during the flight, and
 the damper comprises a stiffness variable mechanism configured to change stiffness of the damper in response to variation in the mass of the mass variation device during the flight,
a first end of the damper is fixed to the fuselage at a position higher than the mounting device and a second end of the damper is fixed to an upper side of the mounting device,
the mass variation device is mounted on a lower side of the mounting device, and
the damper is configured to suspend the mounting device on which the mass variation device is mounted.

14. The rotary-wing aircraft according to claim 1, wherein
a first end of the damper is fixed to the fuselage at a position higher than the mounting device and a second end of the damper is fixed to an upper side of the mounting device,
the mass variation device is mounted on a lower side of the mounting device, and
the damper is configured to suspend the mounting device on which the mass variation device is mounted.

15. The rotary-wing aircraft according to claim 2, wherein
a first end of the damper is fixed to the fuselage at a position higher than the mounting device and a second end of the damper is fixed to an upper side of the mounting device,
the mass variation device is mounted on a lower side of the mounting device, and
the damper is configured to suspend the mounting device on which the mass variation device is mounted.

16. The rotary-wing aircraft according to claim 3, wherein
a first end of the damper is fixed to the fuselage at a position higher than the mounting device and a second end of the damper is fixed to an upper side of the mounting device,
the mass variation device is mounted on a lower side of the mounting device, and
the damper is configured to suspend the mounting device on which the mass variation device is mounted.

17. The rotary-wing aircraft according to claim 4, wherein
a first end of the damper is fixed to the fuselage at a position higher than the mounting device and a second end of the damper is fixed to an upper side of the mounting device,
the mass variation device is mounted on a lower side of the mounting device, and
the damper is configured to suspend the mounting device on which the mass variation device is mounted.

18. The rotary-wing aircraft according to claim 1, wherein the stiffness variable mechanism comprises a hydraulic damper.

19. The rotary-wing aircraft according to claim 1, wherein the stiffness variable mechanism comprises a magneto-rheological damper.

* * * * *